(12) United States Patent
Subramanian et al.

(10) Patent No.: US 9,853,262 B2
(45) Date of Patent: Dec. 26, 2017

(54) BATTERY PACK RETENTION ASSEMBLY AND RETENTION METHOD

(71) Applicant: FORD GLOBAL TECHNOLOGIES, LLC, Dearborn, MI (US)

(72) Inventors: Rajaram Subramanian, Ann Arbor, MI (US); Tom M. Gunther, Canton, MI (US); Saravanan Paramasivam, South Lyon, MI (US); Steve Droste, Ypsilanti, MI (US); Rohit Gunna, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 152 days.

(21) Appl. No.: 14/534,430

(22) Filed: Nov. 6, 2014

(65) Prior Publication Data

US 2016/0133895 A1 May 12, 2016

(51) Int. Cl.
*H01M 2/10* (2006.01)
*B60L 11/18* (2006.01)

(52) U.S. Cl.
CPC ....... *H01M 2/1077* (2013.01); *B60L 11/1879* (2013.01); *H01M 2/1083* (2013.01); *H01M 2220/20* (2013.01)

(58) Field of Classification Search
None
See application file for complete search history.

(56) References Cited

U.S. PATENT DOCUMENTS

| | | |
|---|---|---|
| 2005/0260488 A1 | 11/2005 | Zhou et al. |
| 2012/0045681 A1 | 2/2012 | Klaus et al. |
| 2012/0175177 A1 | 7/2012 | Lee et al. |
| 2013/0071705 A1 | 3/2013 | Frutschy et al. |
| 2013/0095360 A1* | 4/2013 | Niedzwiecki ....... H01M 2/1077 429/99 |
| 2013/0108902 A1 | 5/2013 | Kristofek et al. |
| 2014/0147717 A1 | 5/2014 | Sundararajan et al. |

FOREIGN PATENT DOCUMENTS

JP 4965012 7/2012

OTHER PUBLICATIONS

Definition of "misaligned" from www.dictionary.com (Jan. 2, 2017).*

* cited by examiner

*Primary Examiner* — Miriam Stagg
*Assistant Examiner* — Carmen Lyles-Irving
(74) *Attorney, Agent, or Firm* — Carlson, Gaskey & Olds, P.C.

(57) ABSTRACT

An exemplary assembly includes an extrusion providing a channel that receives a portion of a battery cell frame. The extrusion is securable to a support to secure the battery cell frame relative to the support.

15 Claims, 10 Drawing Sheets

BATTERY PACK RETENTION ASSEMBLY AND RETENTION METHOD

TECHNICAL FIELD

This disclosure is directed toward retaining areas of a battery pack and, more particularly, to utilizing an extrusion to secure portions of a battery array within a battery pack.

BACKGROUND

Generally, electrified vehicles differ from conventional motor vehicles because electrified vehicles are selectively driven using one or more battery-powered electric machines. Conventional motor vehicles, by contrast, rely exclusively on an internal combustion engine to drive the vehicle. Electrified vehicles may use electric machines instead of, or in addition to, the internal combustion engine.

Example electrified vehicles include hybrid electric vehicles (HEVs), plug-in hybrid electric vehicles (PHEVs), fuel cell vehicles, and battery electric vehicles (BEVs). A powertrain of an electrified vehicle is typically equipped with a battery pack having battery cells that store electric power for powering the electric machines.

The battery pack can include multiple arrays of battery cells contained within a housing. Securing the arrays can be required.

SUMMARY

An assembly according to an exemplary aspect of the present disclosure includes, among other things, an extrusion providing a channel that receives a portion of a battery cell frame. The extrusion securable to a support to secure the battery cell frame relative to the support.

In a further non-limiting embodiment of the foregoing assembly, the channel slideably receives the portion.

In a further non-limiting embodiment of any of the foregoing assemblies, the assembly includes a snap-fit feature that includes a ridge receivable within a groove. The extrusion engages the portion using the snap-fit feature when the channel receives the portion.

In a further non-limiting embodiment of any of the foregoing assemblies, the extrusion extends longitudinally along a first axis, and the channel and the groove extend along a second axis aligned with the first axis.

In a further non-limiting embodiment of any of the foregoing assemblies, the portion is a foot extending laterally from other portions of the frame. The channel includes an upper retention flange and a lower retention flange extending from a wall. The upper retention flange is positioned against an upwardly facing surface of the foot when the channel receives the foot. The lower retention flange is positioned against a downwardly facing surface of the foot when the channel receives the foot.

In a further non-limiting embodiment of any of the foregoing assemblies, the assembly includes a securement flange extending from the wall opposite the upper retention flange and the lower retention flange.

In a further non-limiting embodiment of any of the foregoing assemblies, the securement flange includes an aperture to receive a mechanical fastener that secures the extrusion to the structure.

In a further non-limiting embodiment of any of the foregoing assemblies, the extrusion is a metallic material.

In a further non-limiting embodiment of any of the foregoing assemblies, the assembly includes an end cap, wherein the extrusion extends longitudinally along an axis from a first end portion to an opposing second end portion, the end cap secured to the first end portion to limit movement along the axis of the extrusion relative to the portion.

In a further non-limiting embodiment of any of the foregoing assemblies, the extrusion has a "C" shaped cross-sectional profile.

An assembly according to another exemplary aspect of the present disclosure includes, among other things, a plurality of battery cells along an axis and a plurality of frames holding one or more of the plurality of battery cells. Each frame includes a first foot extending outwardly from the axis on a first lateral side and a second foot extending outwardly from the axis on an opposite, second lateral side. A first extrusion has a first channel that receives the first feet of the plurality of frames. A second extrusion has a second channel that receives the second feet of the plurality of frames.

In a further non-limiting embodiment of the foregoing assembly, the assembly includes a snap-fit feature includes a ridge receivable within a groove. The first extrusion engages the first feet using the snap-fit feature when the channel of the first extrusion receives the first feet.

In a further non-limiting embodiment of any of the foregoing assemblies, the first extrusion slideably engages the first feet and the second extrusion slideably engages the second feet In a further non-limiting embodiment of any of the foregoing assemblies, the assembly includes an end cap. The first extrusion extends longitudinally along an axis from a first end portion to an opposing second end portion. The end cap is secured to the first end portion to limit movement along the axis of the first extrusion relative to the first feet.

A method of securing portions of a battery pack according to an exemplary aspect of the present disclosure includes, among other things, slidably engaging a portion of a battery cell frame within a channel of an extrusion, and securing the extrusion to a support to secure the battery cell frame.

In another example of the foregoing method, the battery cell frame extends about the perimeter of at least one battery cell.

In another example of any of the foregoing methods, the portion is a foot extending laterally outward from the remaining portions of the battery support frame.

In another example of any of the foregoing methods, the extrusion engages a portion of a plurality of other battery cell frames.

In another example of any of the foregoing methods, the method further comprises using the extrusion to limit both upward and downward movement of the battery cell frame.

In another example of any of the foregoing methods, the method further comprises snap-fitting the extrusion to the battery cell frame.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to an extrusion that secure a battery array within a battery pack. The extrusion provides effective retention within a relatively tight packaging space.

Figure 1:
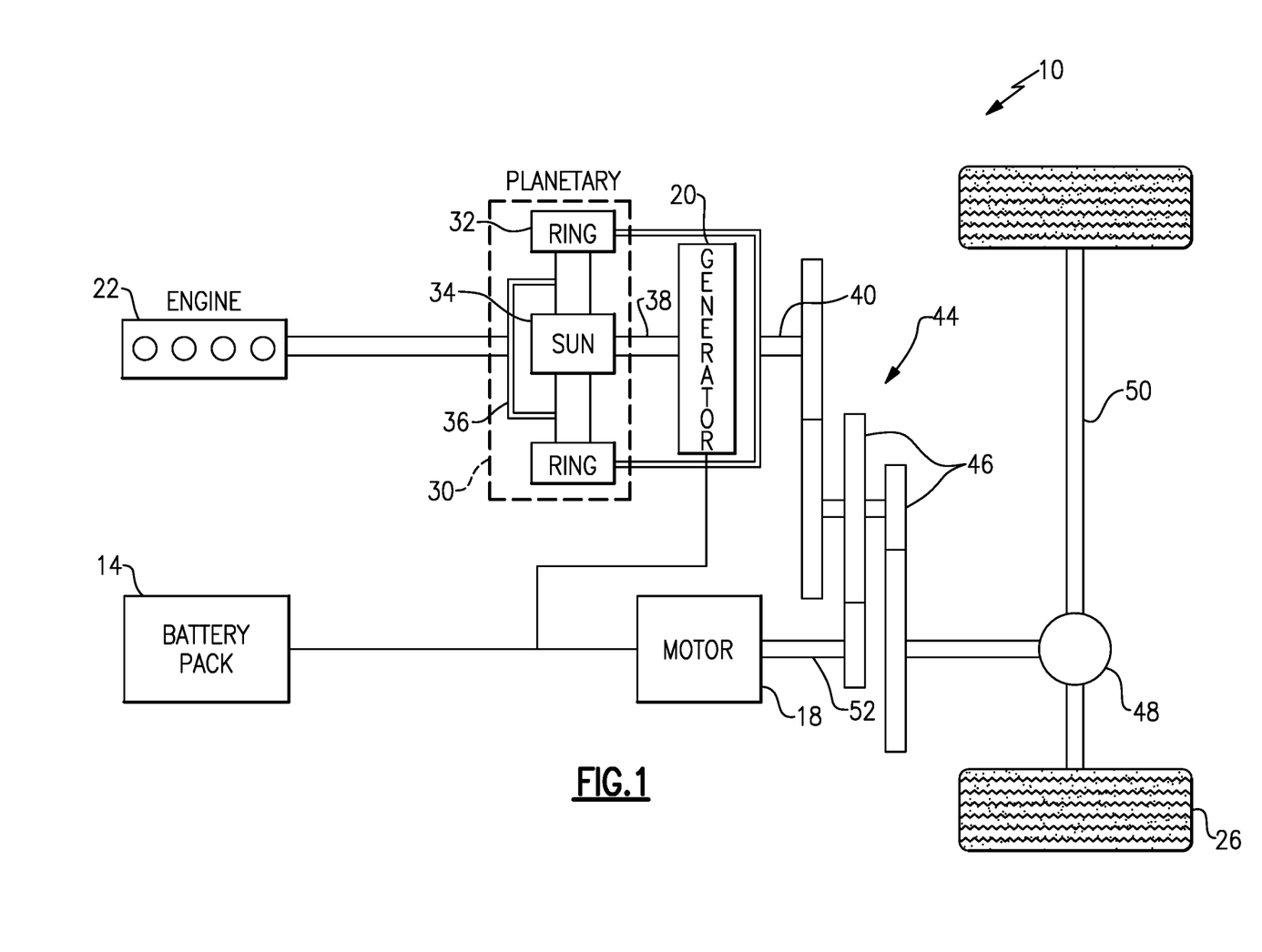
FIG. 1 is a schematic view of an example powertrain of an electrified vehicle.

FIG. 1 schematically illustrates a powertrain 10 for a hybrid electric vehicle (HEV). The powertrain 10 includes a battery pack 14, a motor 18, a generator 20, and an internal combustion engine 22.

The motor 18 and generator 20 are types of electric machines. The motor 18 and generator 20 may be separate or may have the form of a combined motor-generator.

In this embodiment, the powertrain 10 is a power-split powertrain system that employs a first drive system and a second drive system. The first and second drive systems generate torque to drive one or more sets of vehicle drive wheels 26 of the electrified vehicle. The first drive system includes a combination of the engine 22 and the generator 20. The second drive system includes at least the motor 18, the generator 20, and the battery pack 14. The motor 18 and the generator 20 are portions of an electric drive system of the powertrain 10.

The engine 22, which is an internal combustion engine in this example, and the generator 20 may be connected through a power transfer unit 30, such as a planetary gear set. Of course, other types of power transfer units, including other gear sets and transmissions, may be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30. Because the generator 20 is operatively connected to the engine 22, the speed of the engine 22 can be controlled by the generator 20.

The ring gear 32 of the power transfer unit 30 can be connected to a shaft 40, which is connected to vehicle drive wheels 26 through a second power transfer unit 44. The second power transfer unit 44 may include a gear set having a plurality of gears 46. Other power transfer units may also be suitable. The gears 46 transfer torque from the engine 22 to a differential 48 to ultimately provide traction to the vehicle drive wheels 26. The differential 48 may include a plurality of gears that enable the transfer of torque to the vehicle drive wheels 26. In this example, the second power transfer unit 44 is mechanically coupled to an axle 50 through the differential 48 to distribute torque to the vehicle drive wheels 26.

The motor 18 can also be employed to drive the vehicle drive wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery pack 14.

Figure 2:
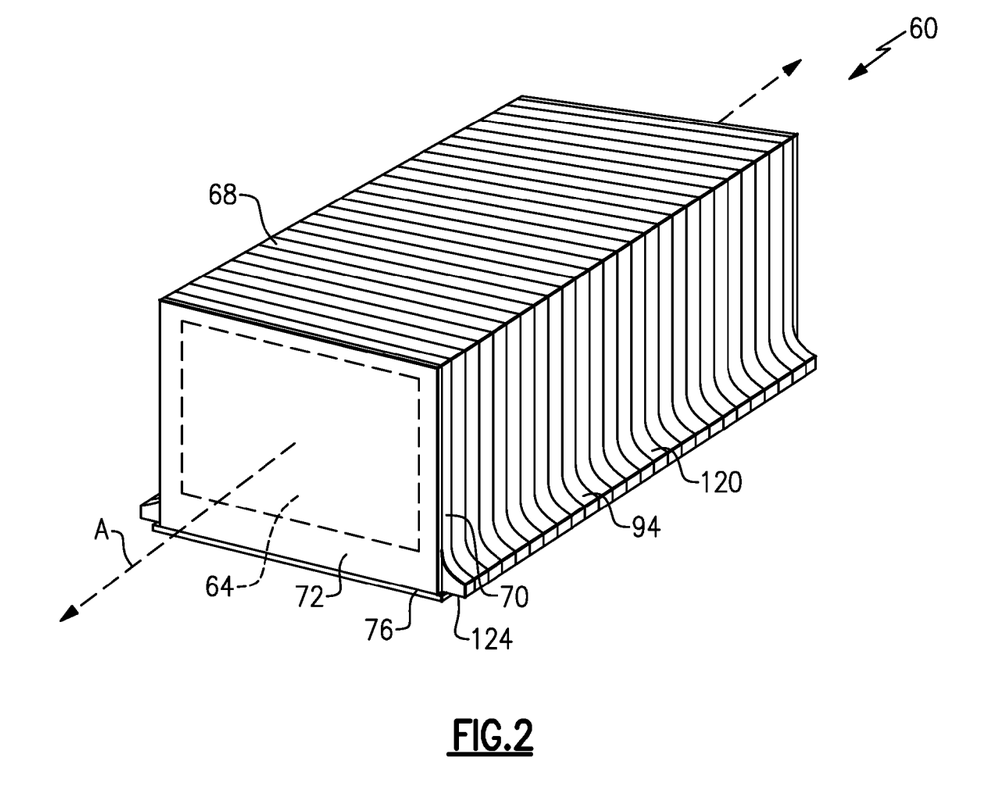
FIG. 2 is a schematic perspective view of a battery array within powertrain of FIG. 1.
Figure 3:
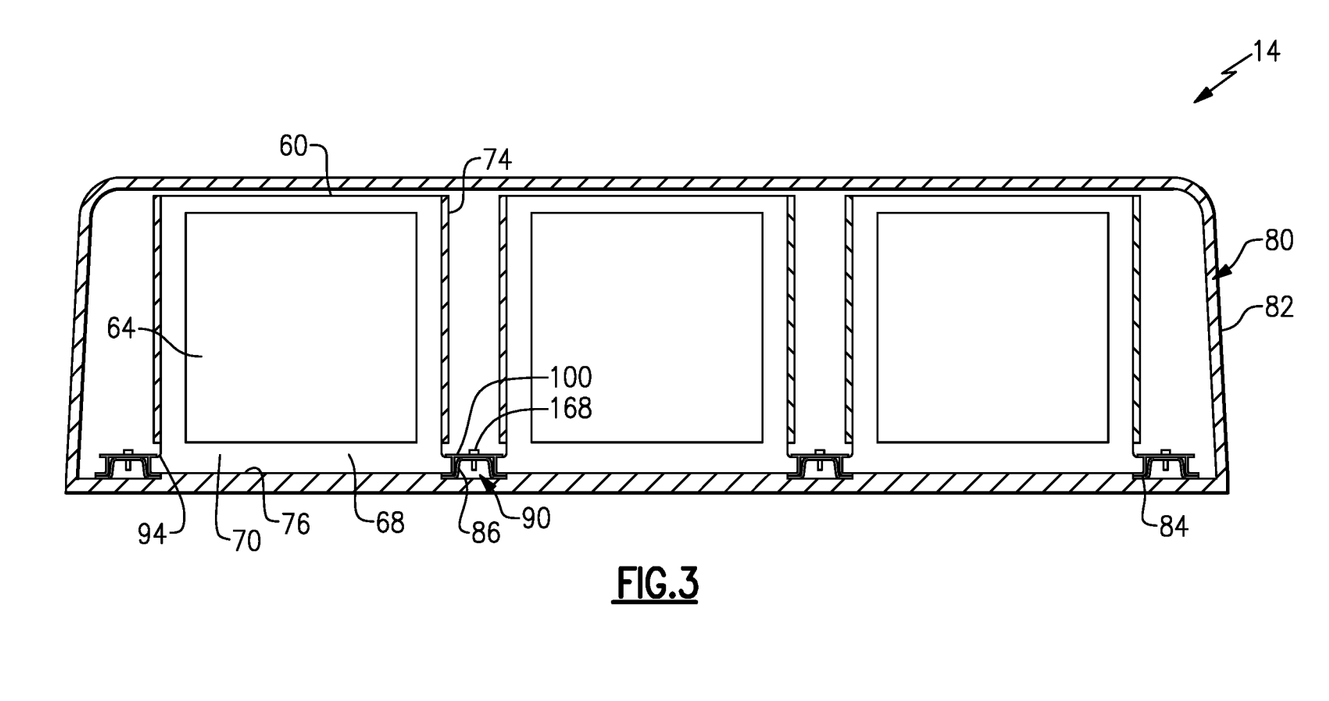
FIG. 3 is a schematic section view of a battery pack of the powertrain of FIG. 1 incorporating the battery array of FIG. 2.
Figure 4:
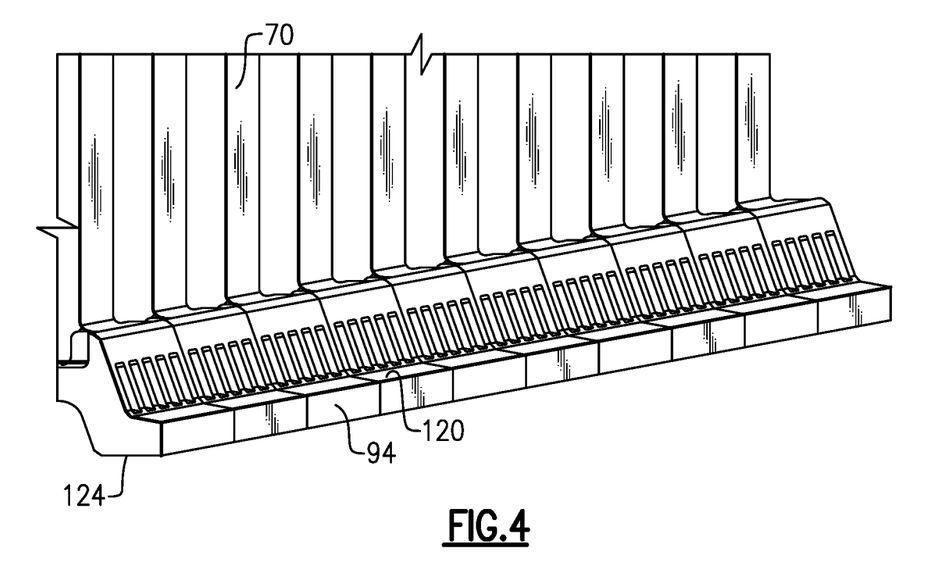
FIG. 4 is a close-up perspective view of example support structures that hold battery cells within the array of FIG. 2.

Referring now to FIGS. 2 to 4, the example battery pack 14 provides a relatively high-voltage battery that stores generated electrical power and outputs electrical power to operate the motor 18, the generator 20, or both.

The battery pack 14 includes a plurality of arrays 60. Each of the arrays 60 includes a plurality of individual battery cells 64 held within a support structure 68. For example, each of the arrays 60 may include from thirty to fifty individual battery cells 64. The battery cells 64 are distributed along an axis A.

The support structure 68 includes, among other things, a battery cell frame 70 about the perimeter of each of the battery cells 64. Each frame 70 supports two individual battery cells 64 in this example. The frames 70 are a polymer material in this example.

The frames 70 and battery cells 64 are held axially between end walls 72. The frames 70 and the battery cells 64 are held laterally between side walls 74.

The frames 70 are disposed on a cold plate 76. A coolant can circulates through channels within the cold plate 76 to carry thermal energy from the arrays 60. Cooling fins (not shown) may be placed between axially adjacent battery cells 64 to communicate thermal energy downward to the cold plate 76.

The battery pack 14 includes a case 80 that houses the arrays 60. The case includes a lid 82 secured to a floor 84.

In this example, the battery pack 14 includes supports 86 extending longitudinally in a direction aligned with the axis A. The supports 86 are positioned between arrays 60 within the battery pack 14. The supports 86 have a "U" shaped profile such that an open area 90 can be provided between the supports 86 and the floor 84 when the supports 86 are secured to the floor 84. The supports 86 can be welded to the floor 84 of the case 80, for example.

The frames 70 include feet 94 extending laterally outward from the axis A. The feet 94 may extend laterally outside the cold plate 70.

To secure the array relative to the case 80, an extrusion 100 engages the feet 94 on one lateral side of the array 60. The extrusion 100 is then secured to the support 86 to stabilize the array 60 within the battery pack 14. The example arrays 60 are secured, through the extrusion 100 and ridge member 86, to the floor 84 of the case 80.

Referring now to FIGS. 5 to 11 with continuing reference to FIGS. 2 and 3, the example extrusion 100 includes an upper retention flange 104, a lower retention flange 108, a wall 112, and a securement flange 116. The upper retention flange 104 and the lower retention flange 108 extend in a first direction from the opposing ends of the wall 112 to provide a channel 118. The securement flange 116 extends from the wall 112 opposite the upper retention flange 104 and the lower retention flange 108.

Figure 5:
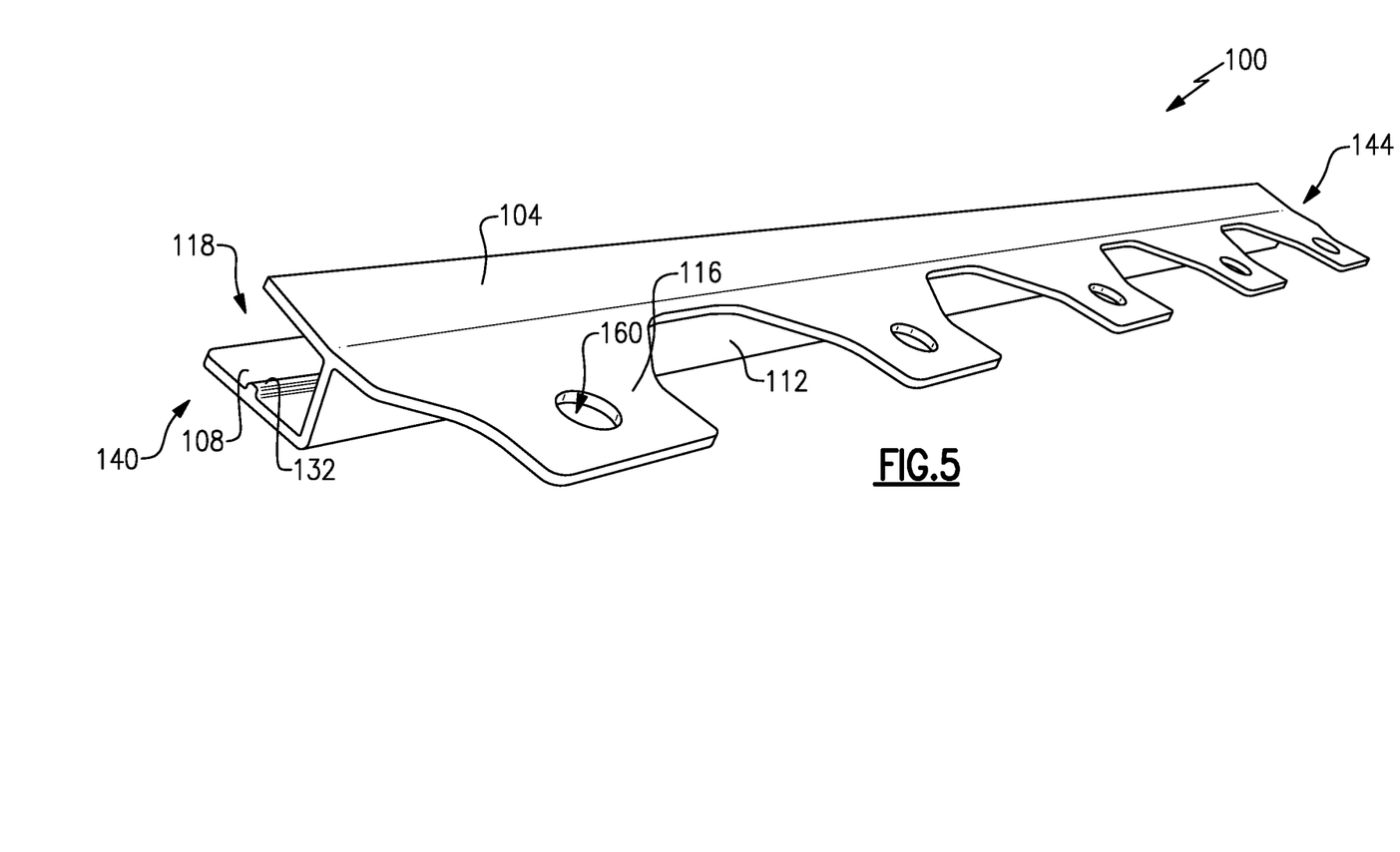
FIG. 5 is a perspective view of an example extrusion that secures the battery array of FIG. 2 within the battery pack of FIG. 3.

The shape of the channel 118 corresponds generally to the shape of the feet 94. The example channel 118 has a "C" shaped cross-sectional profile.

Figure 6:
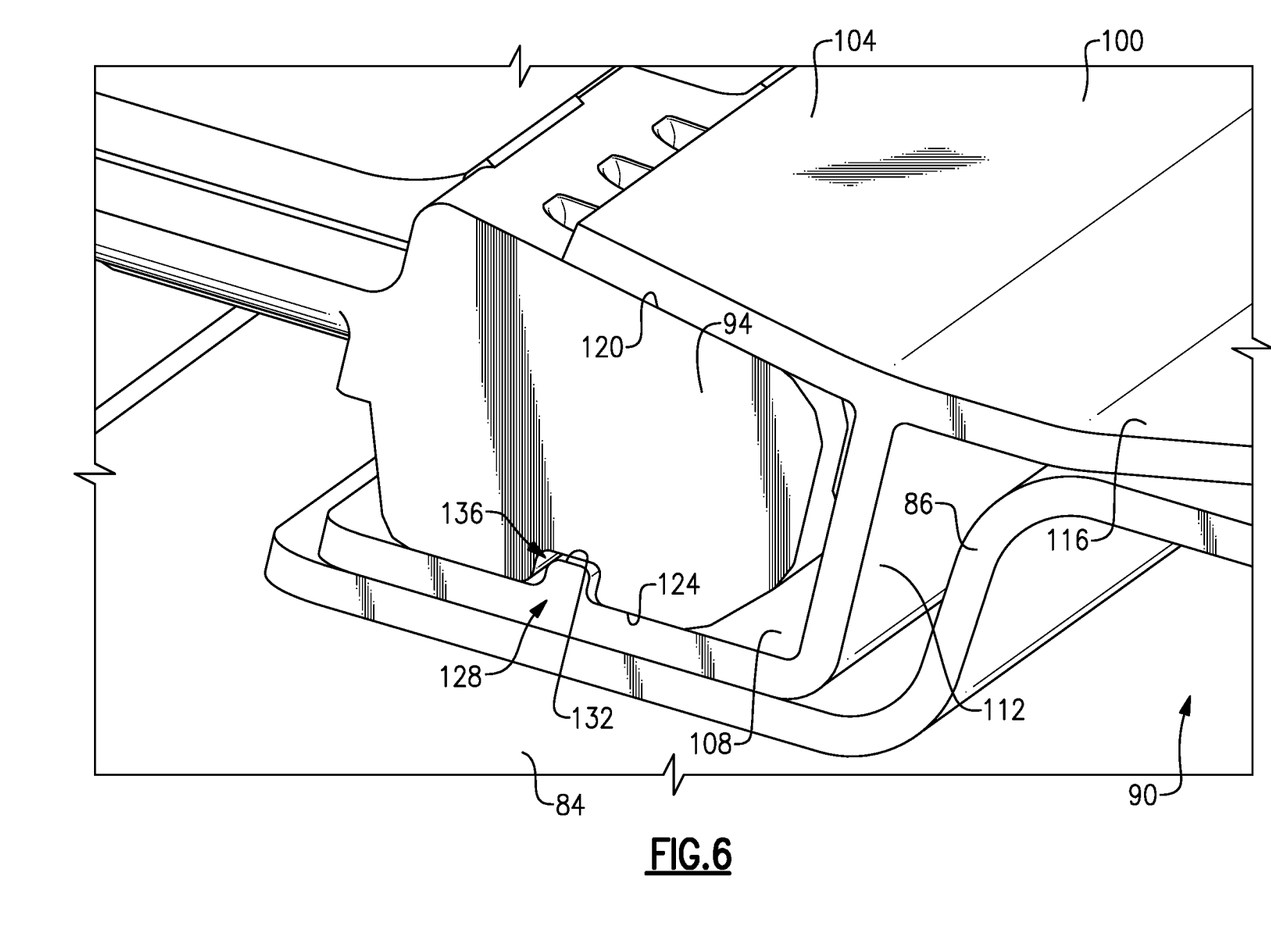
FIG. 6 shows a close-up perspective view of the extrusion of FIG. 5 securing the battery array of FIG. 2 within the battery pack of FIG. 3.

When the feet 94 are received within the channel 118, the upper retention flange 104 is positioned against an upwardly facing surface 120 of the feet 94, and the lower retention flange 108 is positioned against the downwardly facing surfaces 124 of the feet 94.

Figure 8:
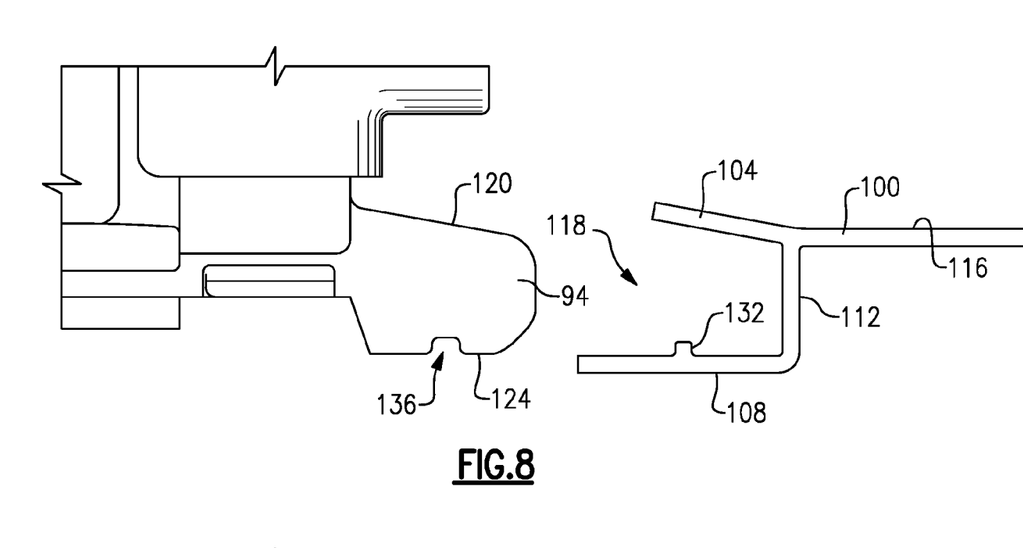
FIG. 8 shows a side view of the extrusion of FIG. 4 disengaged from the battery array of FIG. 2.
Figure 9:
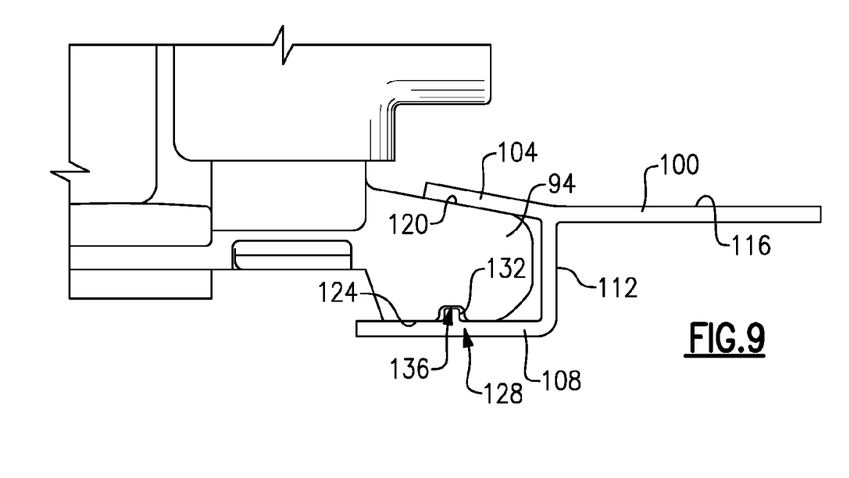
FIG. 9 shows a side view of the extrusion of FIG. 4 engaged with the battery array of FIG. 2.

The feet 94 and the extrusion 100 include a snap-fit feature 128 to help hold the feet 94 within the channel 118 of the extrusion 100. The example snap-fit feature 128 includes a ridge 132 and a groove 136. The ridge 132 extends upwardly from the lower retention flange 108. The groove 136 is provided within the downwardly facing surface 124 of the feet 94. When the feet 94 are positioned within the channel 118, the ridge 132 contacts the sides of the groove 136 to prevent the extrusion 100 from moving laterally outward relative to the feet 94.

The example extrusion 100 extends longitudinally from a first end 140 to an opposing second end 144 along an axis that is generally aligned with the axis A of the array 60. The extrusion 100 is a metallic material, such as an aluminum.

During assembly, the lid 82 is detached from the floor 84 such that the arrays 60 can be positioned within the battery pack 14. In this example, the feet 94 are positioned within the extrusion 100 prior to positioning the arrays 60 within the pack 14. Feet on the opposing lateral side of the arrays 60 are positioned within another extrusion. Notable, the extrusion 100 and the other extrusion have a common cross-sectional profile. The same extrusion manufacturing process can thus provide extrusions to engage feet on both sides of the arrays 60.

Figure 10:
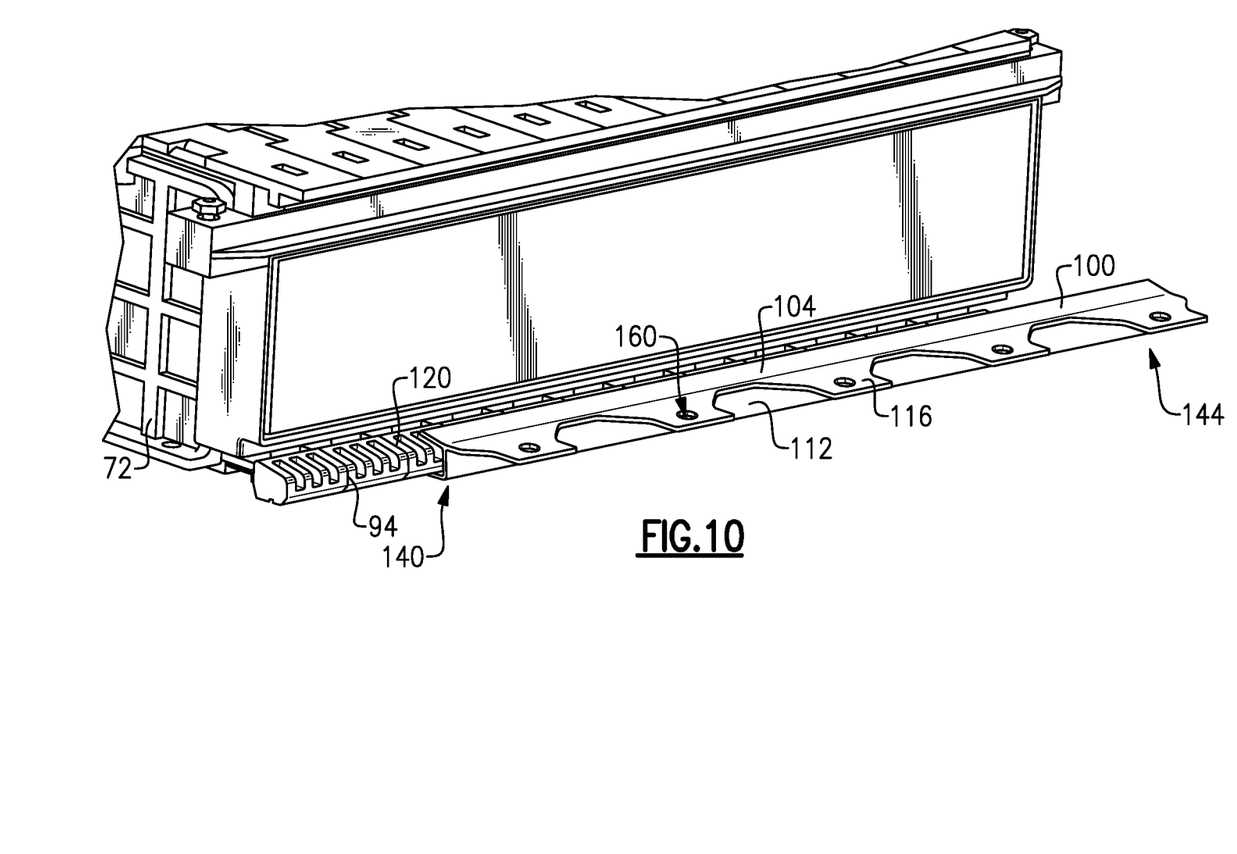
FIG. 10 shows a perspective view of the extrusion of FIG. 4 engaging the array in a first position.
Figure 11:
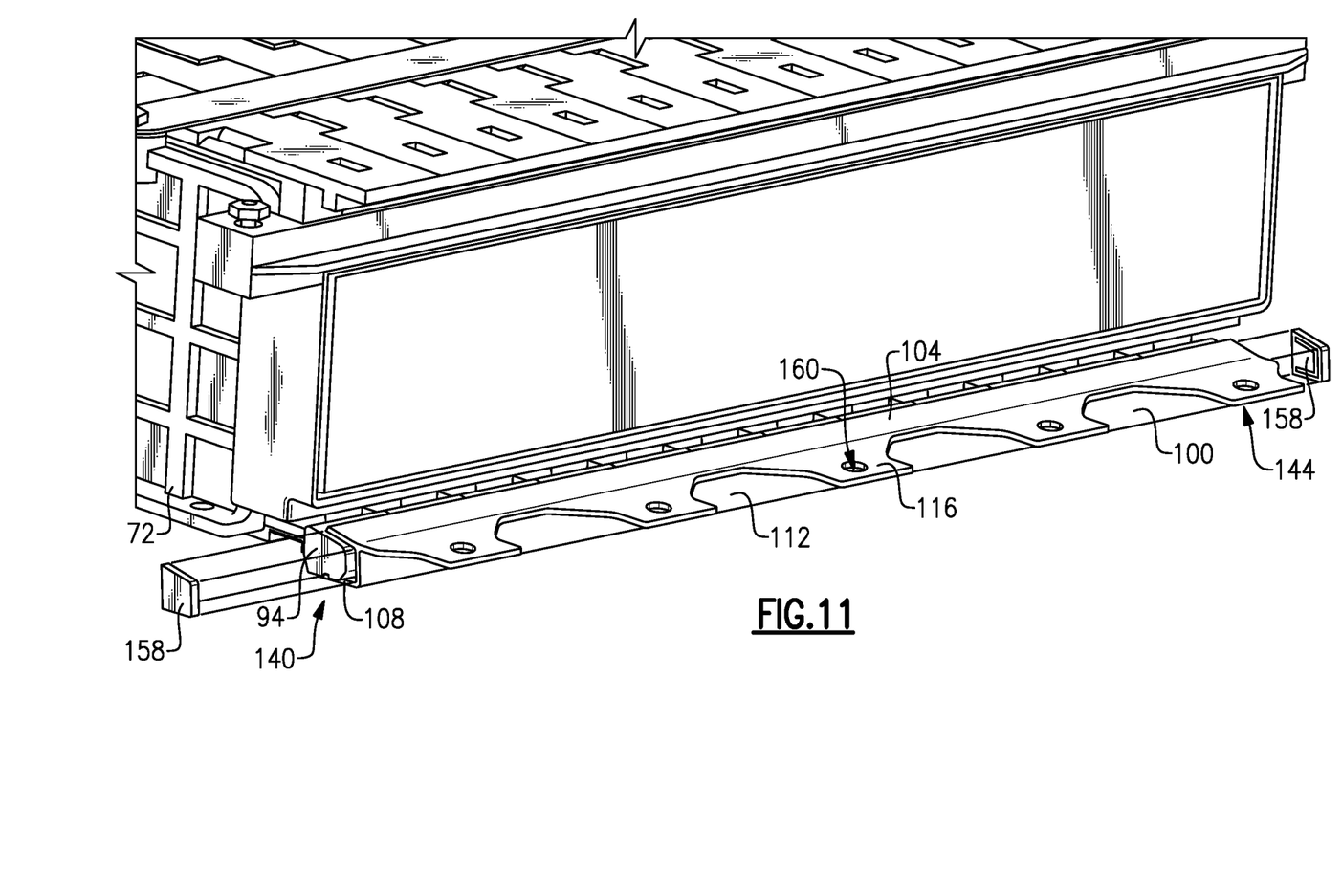
FIG. 11 shows the extrusion of FIG. 4 engaging the array in a second position.

The extrusion 100 can slideably engage the feet 94 to position the feet 94 within the extrusion 100. FIG. 10 shows the extrusion 100 in a partially slid position relative to the feet 94. FIG. 11 shows the extrusion 100 in a fully slid position relative to the feet 94.

When the feet 94 are positioned within the extrusion 100, and the extrusion 100 is axially aligned with the feet 94 as is shown in FIG. 11, the arrays 60 are then positioned on the floor 84 of the battery pack 18.

In some examples, after positioning the extrusion 100 on the feet 94 as shown in FIG. 11, end caps 158 are secured to the first end 140 and the second end 144 to prevent movement of the extrusion 100 relative to the feet 94 along the axis as the array 60 is positioned upon the floor 84. The end caps 158 are welded to the extrusion 100, for example.

Figure 7:
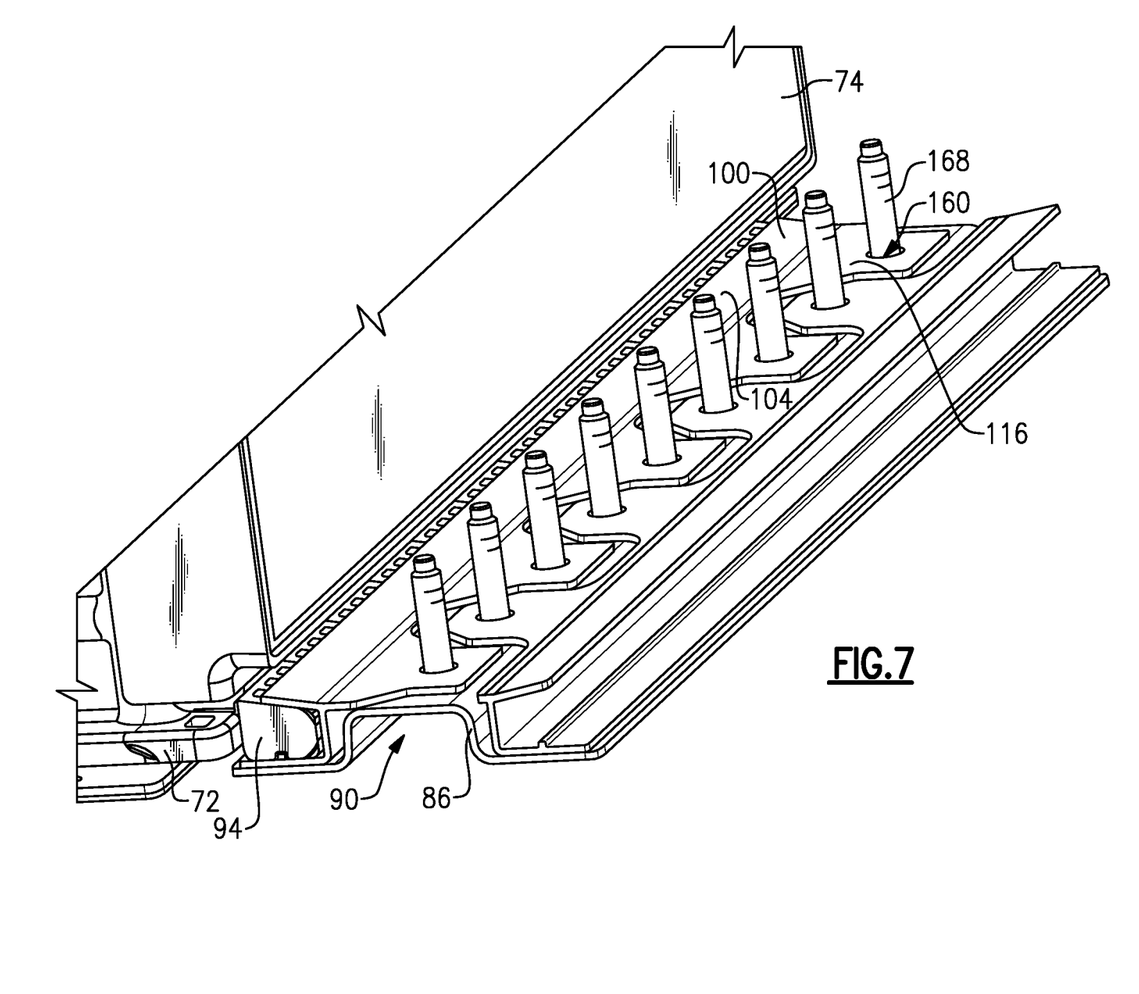
FIG. 7 shows a perspective view of selected portion of the battery pack of FIG. 3.

The securement flange 116 provides apertures 160 corresponding to apertures 164 provided within the supports 86. The arrays 60 and the extrusion 100 are positioned within the battery pack 18 such that the apertures 160 and 164 are aligned. A mechanical fastener 168 is the positioned within the apertures 160 and 164 to hold the extrusion 100 relative to the supports 86. A lock nut may be welded to the supports 86 within the open area 90 provide a threaded connection to the fastener 168.

When the extrusion 100 is secured to the supports 86, the extrusion 100 limits vertical movements of the array 60. Vertical upward movement of the array 60 is limited by the upwardly facing surface 120 contacting the upper retention flange 104. Movements of array 60 along the axis A are limited by the end walls 72.

Features of the disclosed examples include a retention strategy for arrays within a battery pack. The retention strategy is cost-effective and provides retention within relatively tight packaging areas. Using the extrusion for retention may reduce labor time for installation compared to other conventional fastening methods. The thicknesses of the extrusion can be adjusted at various axial positions if local strengthening is required. Cost and time for developing a retention feature for the battery pack is also reduced.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An assembly, comprising:
an extrusion providing a channel that receives a portion of a battery cell frame, the extrusion securable to a support to secure the battery cell frame relative to the support, wherein the channel is provided by an upper retention flange, a lower retention flange, and a wall of the extrusion, the upper retention flange extending from the wall to an upper retention flange leading edge, the lower retention flange extending from the wall to a lower retention flange leading edge; and
a snap-fit feature that includes a ridge receivable within a groove, the extrusion engaging the portion using the snap-fit feature when the channel receives the portion, the snap-fit feature positioned entirely within the channel when the channel receives the portion such that the snap-fit feature is spaced a distance from both the upper retention flange leading edge and the lower retention flange leading edge,
wherein the extrusion extends longitudinally along a first axis, and the channel and the groove extend along a second axis aligned with the first axis.

2. The assembly of claim 1, wherein the channel is configured to slideably receive the portion along a direction aligned with the first axis.

3. The assembly of claim 1, wherein the portion is a foot extending laterally from other portions of the frame, the upper retention flange positioned against an upwardly facing surface of the foot when the channel receives the foot, the lower retention flange positioned against a downwardly facing surface of the foot when the channel receives the foot.

4. The assembly of claim 3, further comprising a securement flange extending from the wall opposite the upper retention flange and the lower retention flange.

5. The assembly of claim 4, wherein the securement flange includes an aperture to receive a mechanical fastener that secures the extrusion to the structure.

6. The assembly of claim 1, wherein the extrusion is a metallic material.

7. The assembly of claim 1, further comprising an end cap, wherein the extrusion extends longitudinally along the first axis from a first end portion to an opposing second end portion, the end cap secured to the first end portion to limit movement along the first axis of the extrusion relative to the portion.

8. The assembly of claim 1, wherein the extrusion has a "C" shaped cross-sectional profile.

9. The assembly of claim 1, comprising:
a plurality of battery cells along a third axis,
the battery cell frame being one of a plurality of battery cell frames that hold one or more of the plurality of battery cells, each frame within the plurality of battery cell frames including a first foot extending outwardly from the third axis on a first lateral side and a second foot extending outwardly from the third axis on an opposite, second lateral side,
wherein the extrusion is a first extrusion and the channel is a first channel that receives the first feet of the plurality of frames; and
a second extrusion having a second channel that receives the second feet of the plurality of frames.

10. The assembly of claim 9, wherein the first extrusion slideably engages the first feet and the second extrusion slideably engages the second feet by moving in a direction that is parallel to the third axis.

11. The assembly of claim 9, further comprising an end cap, wherein the first extrusion extends longitudinally along the first axis from a first end portion to an opposing second end portion, the end cap secured to the first end portion to limit movement along the first axis of the first extrusion relative to the first feet.

12. The assembly of claim 1, wherein the extrusion provides the entire channel, and the support is separate and distinct from the extrusion such that the support provides no portion of the extrusion.

13. The assembly of claim 3, wherein the channel is provided entirely by the upper retention flange, the lower retention flange, and the wall as a monolithic structure.

14. The assembly of claim 1, wherein the battery cell frame is one of a plurality of battery cell frames that hold one or more battery cells distributed along a third axis, wherein the channel opens toward the third axis.

15. The assembly of claim 9, wherein the second channel is provided by an upper retention flange and a lower retention flange extending from opposing sides of a wall to respective leading edges that are laterally outside the plurality of battery cells, wherein a line extending from the first channel to the second channel does not intersect the plurality of battery cells.

* * * * *

UNITED STATES PATENT AND TRADEMARK OFFICE
CERTIFICATE OF CORRECTION

| | |
|---|---|
| PATENT NO. | : 9,853,262 B2 |
| APPLICATION NO. | : 14/534430 |
| DATED | : December 26, 2017 |
| INVENTOR(S) | : Rajaram Subramanian et al. |

It is certified that error appears in the above-identified patent and that said Letters Patent is hereby corrected as shown below:

In the Claims

In Claim 5, Column 6, Line 59; after "the extrusion to" replace "the structure." with --the support.--

Signed and Sealed this
Fifteenth Day of May, 2018

Andrei Iancu
*Director of the United States Patent and Trademark Office*